(12) United States Patent
Piva

(10) Patent No.: US 9,808,049 B2
(45) Date of Patent: Nov. 7, 2017

(54) CLAMPING DEVICE FOR A CABLE CLOSURE SYSTEM

(71) Applicant: Northwave S.R.L., Onigo di Pederobba (IT)

(72) Inventor: Gianni Piva, Cavaso del Tomba (IT)

(73) Assignee: NORTHWAVE S.R.L., Treviso (IT)

( * ) Notice: Subject to any disclaimer, the term of this patent is extended or adjusted under 35 U.S.C. 154(b) by 194 days.

(21) Appl. No.: 14/783,388

(22) PCT Filed: Mar. 26, 2014

(86) PCT No.: PCT/EP2014/056065
§ 371 (c)(1),
(2) Date: Oct. 8, 2015

(87) PCT Pub. No.: WO2014/166743
PCT Pub. Date: Oct. 16, 2014

(65) Prior Publication Data
US 2016/0066653 A1   Mar. 10, 2016

(30) Foreign Application Priority Data
Apr. 9, 2013  (IT) .............................. TV2013A0045

(51) Int. Cl.
| A43C 7/00 | (2006.01) |
| A43B 5/00 | (2006.01) |
| A43C 11/16 | (2006.01) |
| F16G 11/12 | (2006.01) |

(52) U.S. Cl.
CPC .................. *A43C 7/00* (2013.01); *A43B 5/00* (2013.01); *A43C 11/165* (2013.01); *F16G 11/12* (2013.01)

(58) Field of Classification Search
CPC ......... A43C 7/00; A43C 11/165; A43C 11/16; A43C 11/20; A43C 11/004; A43B 5/00; F16G 11/12; Y10T 24/2187; Y10T 24/3724
See application file for complete search history.

(56) References Cited

U.S. PATENT DOCUMENTS

| 4,616,524 A * | 10/1986 | Bidoia .................. A43B 5/0449 16/441 |
| 9,072,341 B2 * | 7/2015 | Jungkind ............. A43C 11/165 |
| 9,101,181 B2 * | 8/2015 | Soderberg ............ A43C 11/165 |

(Continued)

FOREIGN PATENT DOCUMENTS

| EP | 0651954 | 5/1995 |
| WO | 2009068503 | 6/2009 |
| WO | 2011109541 | 9/2011 |

*Primary Examiner* — Robert J Sandy
*Assistant Examiner* — Rowland Do
(74) *Attorney, Agent, or Firm* — Cantor Colburn LLP

(57) ABSTRACT

A clamping device for a cable closure system. The clamping device (1) includes a supporting base (2), a pulley (3), operatively associable with a closure cable, and a handle (4), connected integrally to the pulley (3) and manually activatable. The clamping device (1) includes first and second retaining means (5,6) operatively engageable with a toothed surface (331) of the pulley (3) and control means (7), separate from said handle (4). The retaining means (5,6) and the control means (7) are operatively associated with one another so as to be able to obtain a complete release or a controlled release of the clamping tension of the closure cable.

20 Claims, 19 Drawing Sheets

(56) References Cited

U.S. PATENT DOCUMENTS

| | | | | |
|---|---|---|---|---|
| 9,408,438 B2* | 8/2016 | Chen | ............... | A43C 11/165 |
| 2003/0093882 A1* | 5/2003 | Gorza | ............... | A43C 11/16 |
| | | | | 24/68 SK |
| 2010/0251524 A1 | 10/2010 | Chen | | |
| 2011/0266384 A1* | 11/2011 | Goodman | ............ | A43C 11/165 |
| | | | | 242/396.4 |
| 2013/0025100 A1* | 1/2013 | Ha | ............... | A43C 11/165 |
| | | | | 24/712.9 |
| 2016/0213099 A1* | 7/2016 | Ha | ............... | A43C 11/20 |
| 2016/0262496 A1* | 9/2016 | Midorikawa | ........ | A43C 11/165 |

* cited by examiner

CLAMPING DEVICE FOR A CABLE CLOSURE SYSTEM

The present invention relates to a clamping device, in particular a clamping device for articles with cable closure systems or the like.

As is known, the main advantage of a cable closure system is that it enables a relatively high clamping force to be exerted between the parts of the article on which the closure system is mounted.

A cable closure system generally comprises a clamping device able to exert a tensile force on a closure cable, operatively associated with the parts to be clamped, and to guarantee a retaining action of the cable, so as to prevent undesirable slackening thereof.

Patent application EP065194A1 describes a clamping device capable of providing a controlled and a total release of the closure cable. Such a device is relatively difficult to activate, for example when the user is wearing protective gloves.

Other conventional clamping devices do not allow a controlled release of the closure cable. Further, clamping devices currently available on the market have relatively complex and bulky structures, with relatively high costs for production on an industrial scale.

The main aim of the present invention is to provide a clamping device that enables the aforesaid problems to be overcome.

Within this aim, one of the objects of the present invention is to produce a clamping device that is particularly reliable and easy to use, even in adverse environmental conditions.

Another object of the present invention is to produce a clamping device that enables an easily regulated clamping force to be exerted.

A further object of the present invention is to produce a clamping device with a particularly simple, sturdy and compact structure.

Yet another object of the present invention is to produce a clamping device that is relatively simple to produce on an industrial scale, at competitive costs.

The present invention provides a clamping device according to claim 1 and the related dependent claims proposed hereunder.

Further advantages of the clamping device according to the invention will be more apparent with reference to the description below and to the accompanying figures, provided purely for non-limited illustrative purposes, in which FIGS. 1-19 schematically represent some perspective and sectional views of the clamping device according to the invention, in different operating positions, wherein.

Figure 1:
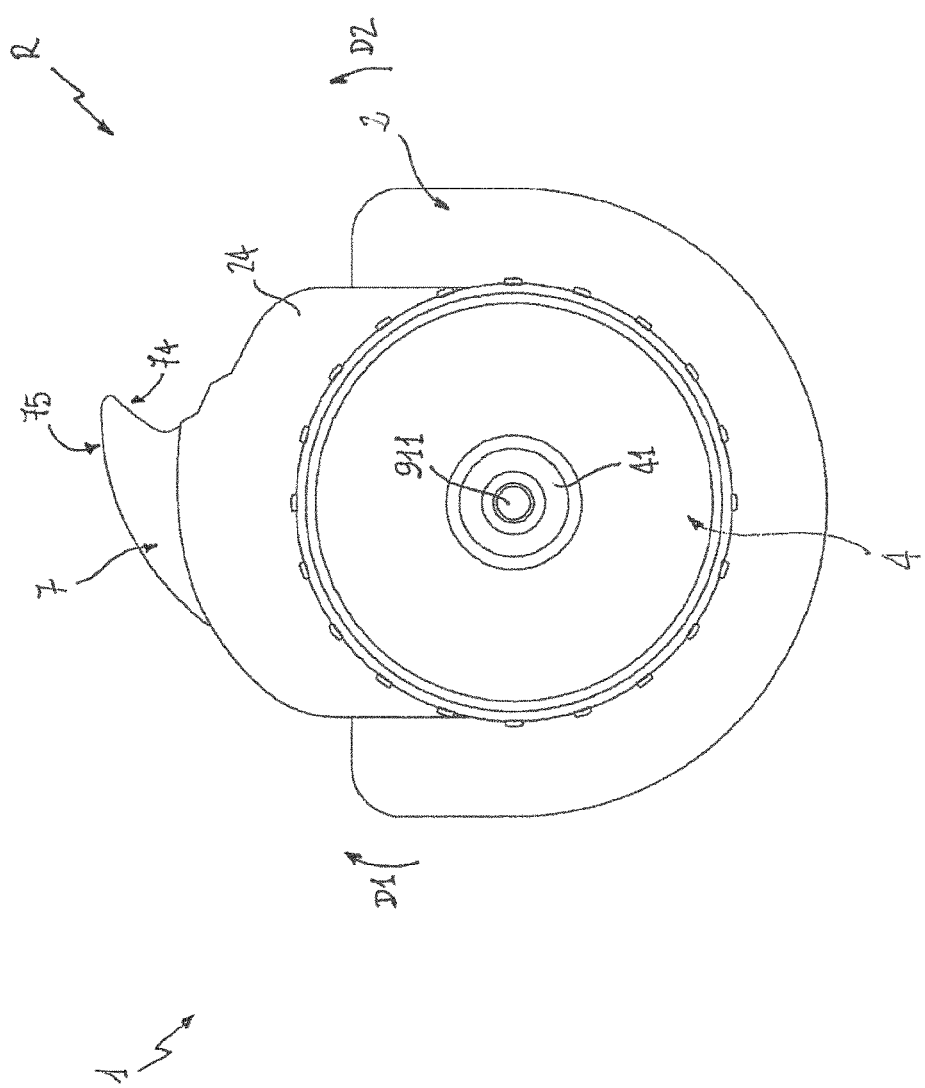
FIG. 1 is an elevational view of the clamping device according to an embodiment of the invention wherein the control lever is in the retaining position.
Figure 2:
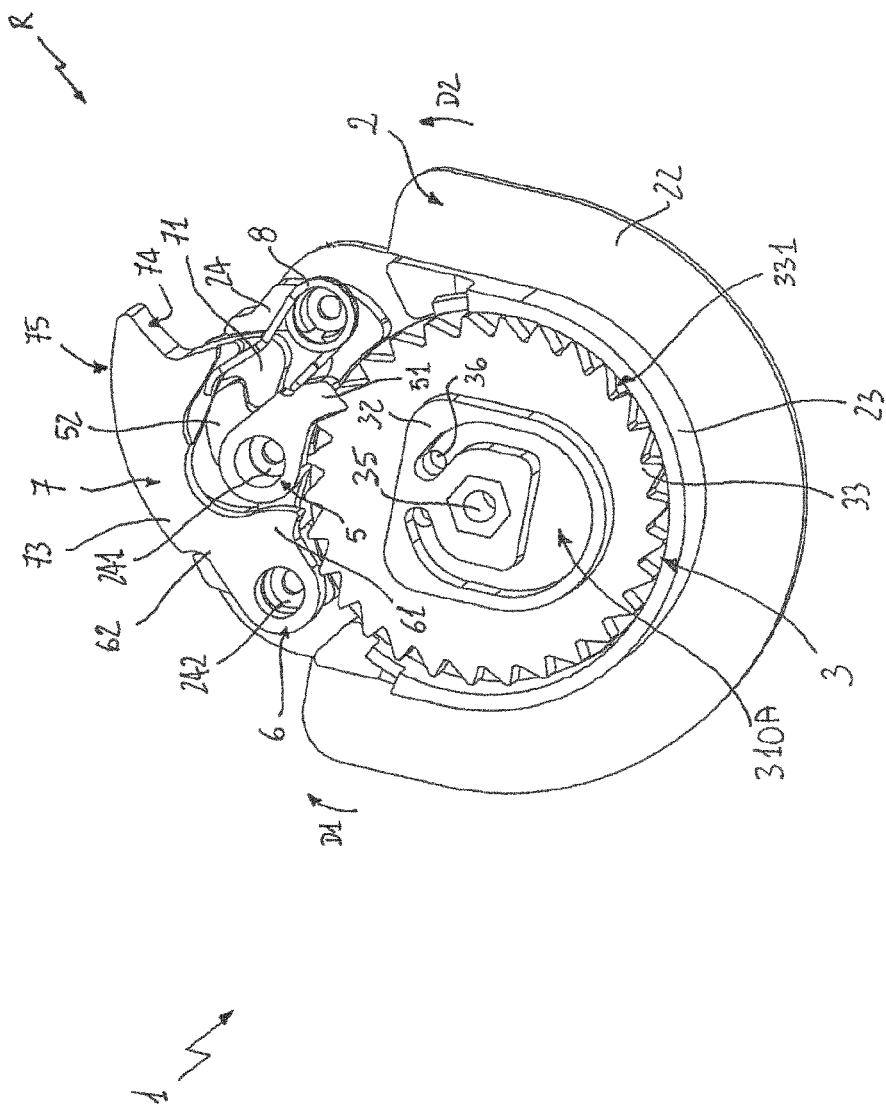
FIGS. 2-3 are perspective views of the clamping device shown in FIG. 1 wherein the control lever is in the retaining position.
Figure 3:
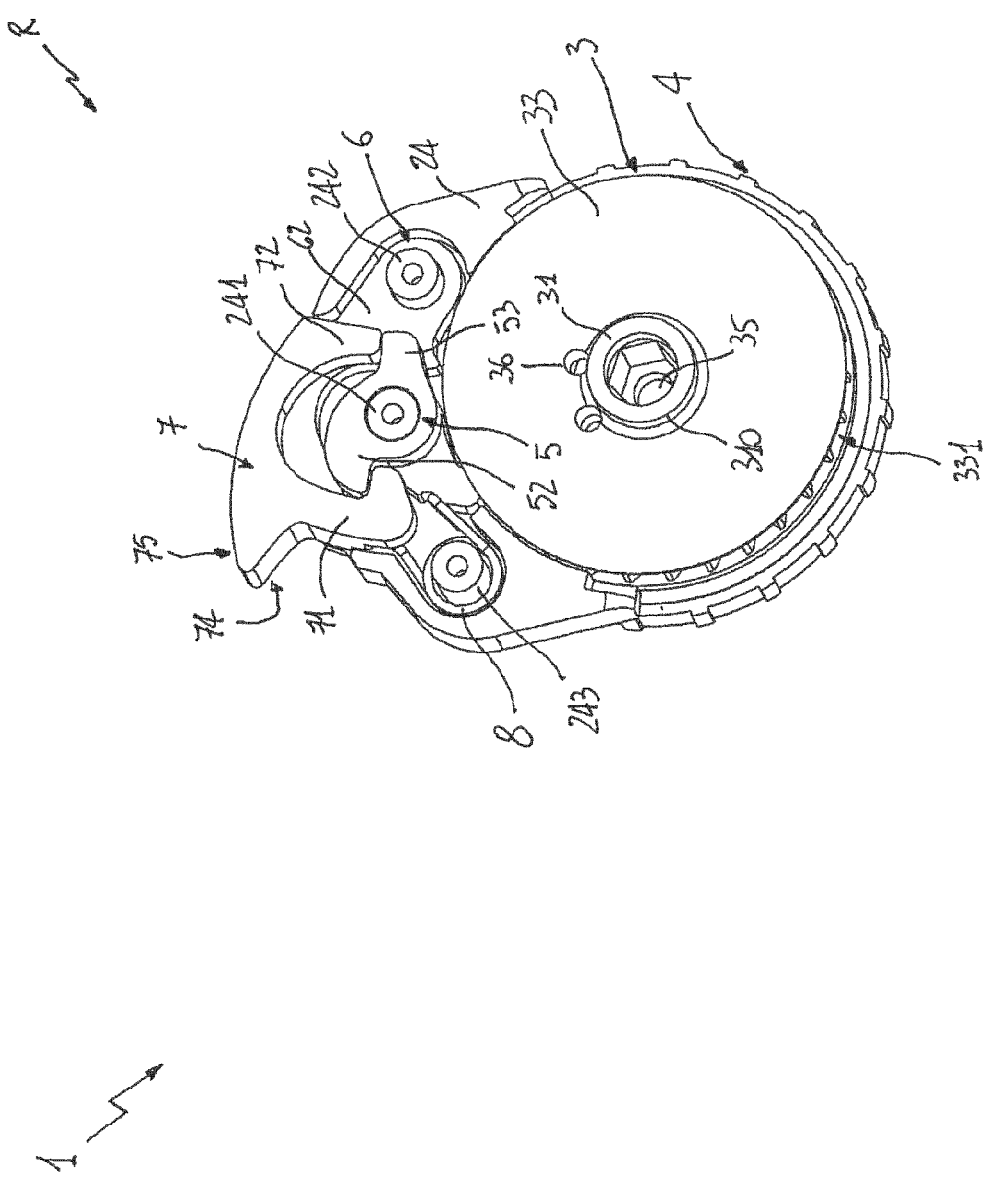
Figure 4:
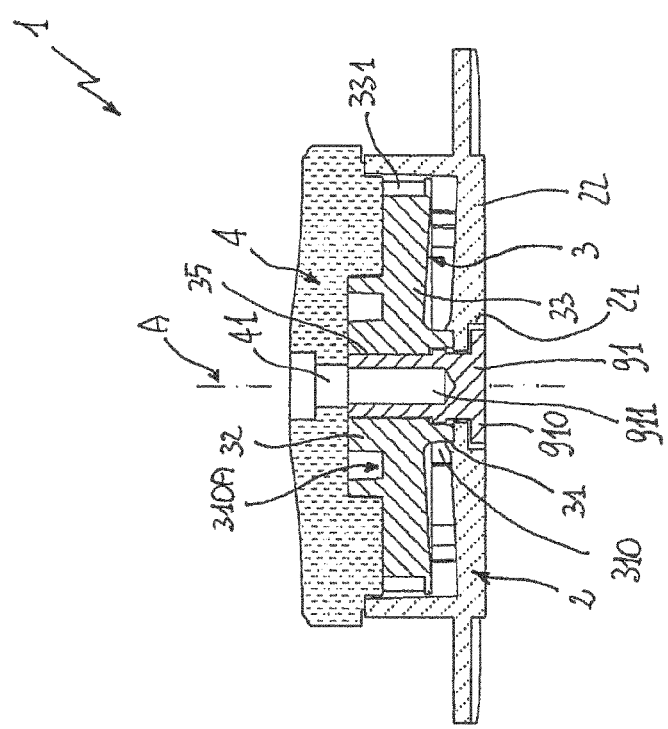
FIGS. 4-7 are sectional views of the clamping device shown in FIGS. 1-3 wherein the control lever is in the retaining position.
Figure 5:
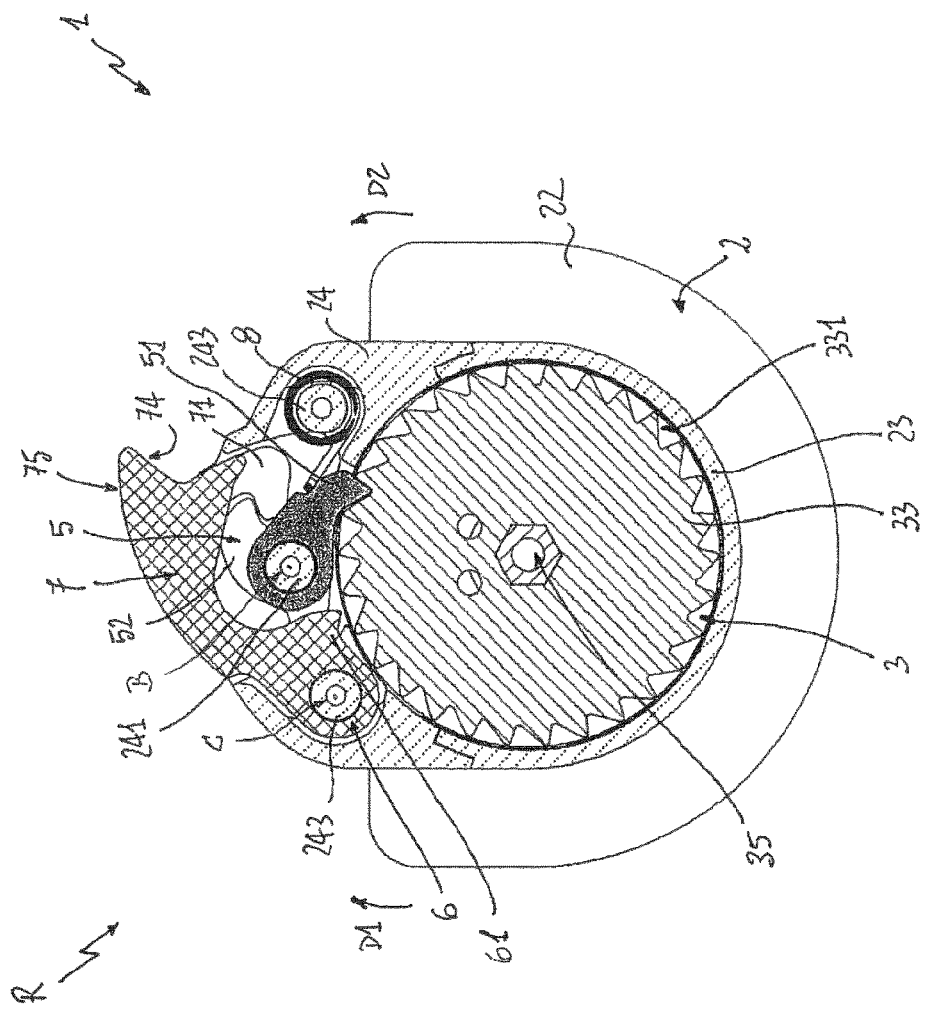

With reference to the aforesaid figures, the present invention relates to a clamping device 1.

The clamping device 1 can be used for any article having a cable closure or similar type of closure system.

The clamping device 1 is particularly suitable for use on garments (for example sportswear) and on footwear, for example walking, safety, alpine skiing, cross-country skiing, snowboarding, trekking, nordic walking, climbing and cycling footwear, as well as on other types of sports footwear.

The clamping device 1 can also be used on any type of sporting equipment, such as snowboards, skis, helmets, accessories, snowshoes and the like.

The clamping device 1 can also be used in orthopedic-medical devices, such as collars, braces, corsets and the like.

The clamping device 1 comprises a supporting base 2 which can be fastened to a surface of the article. For example, when using the clamping device 1 on sports footwear, the base 2 can be fastened to an edge of the upper or to a tongue.

Fastening of the base 2 can advantageously be obtained by gluing, riveting, welding, stitching or using other known techniques.

The clamping device 1 is destined to be operatively associated with at least one closure cable (or other closure element of know type) to exert a tensile force thereon.

Advantageously, the closure cable (not shown) is operatively associated with the parts of the article to be clamped. For example, when the clamping device 1 is used on footwear, it can be operatively associated with the edges of the upper to be clamped, crossing over repeatedly in the lacing area.

The clamping device 1 comprises a pulley 3, operatively associated, in a rotatable manner, with the supporting base 2.

The pulley 3 is operatively associable with the closure cable on a fastening surface 310A, where at least one end or, more in general, at least one portion of the cable can be fastened, in a removable manner, to the pulley 3.

To fasten it to the pulley 3, the closure cable is advantageously passed through one or more through holes 36 obtained on the pulley.

The pulley 3 comprises a winding surface 310 of the closure cable, preferably different from the fastening surface 310A.

The pulley 3 can rotate with respect to the base 2 about a first rotation axis A, perpendicular with respect to the aforesaid base.

In particular, the pulley 3 can rotate according to a first winding direction D1 or to a second unwinding direction D2 of the cable on/from the winding surface 310.

The pulley 3 comprises a toothed surface 331 arranged so that it can be engaged by suitable retaining means.

The clamping device 1 comprises a handle 4 coupled to the pulley 3 so as to be connected integrally therewith.

The handle 4 can be manually actuated to rotate the pulley 3 according to the winding direction D1 and, optionally, also according to the unwinding direction D2.

The clamping device 1 comprises first and second retaining means 5-6, which can be operatively engaged with the toothed surface 331 of the pulley 3, and control means 7, separate from the handle 4, operatively associated with the retaining means 5-6.

Preferably, the clamping device 1 comprises elastic means 8, fixed to the base 2 and operatively associated with the retaining means 5-6 and with the control means 7.

Preferably, the pulley 3 comprises a first portion 31 for coupling with the base 2, a second portion 32 for coupling with the handle 4 and a toothed wheel 33 that comprises the toothed surface 331.

With reference to a positioning of the base 2 on a flat horizontal surface (as shown in the aforesaid figures), the portions 31, 32 of the pulley 3 are respectively positioned above and below with respect to the rotation plane (not shown) of the toothed wheel 33.

The upper surface of the toothed wheel 33 is coupled with the lower surface of the handle 4, advantageously with positive fit.

The portion 31 of the pulley 3 comprises the winding surface 310 and is advantageously shaped so as to maintain the lower surface of the toothed wheel 31 rose with respect to the base 2 and allow the cable to wind on/unwind from the winding surface 310.

According to some embodiments of the invention (not shown), the portion 31 of the pulley 3 comprises a wall that extends parallel to the lower surface of the toothed wheel 31 in a distal position with respect to this latter. Said wall may be in contact with the upper surface of the base 2 and cooperates with the lower surface of the toothed wheel 31 to define a volume in which the closure cable is positioned, when it is wound on the winding surface 310.

It has been seen that such a solution allows decreasing friction between the closure cable and the base 2, thereby facilitating the rotation movement of the pulley 3 and the winding/unwinding of the closure cable on/from the winding surface 310.

The portion 32 of the pulley 3 comprises the fastening surface 310A and is coupled with the handle 4.

In this way, although the handle 4 is coupled integrally with the pulley 3, the assembly formed thereby can rotate with respect to the base 2.

Advantageously, the retaining means 5-6 are arranged in lateral position with respect to the assembly formed by the pulley 3 and by the handle 4, so as to be able to interact easily with the toothed surface 331.

Also the control means 7 are arranged in lateral position with respect to the assembly formed by the pulley 3 and by the handle 4, so as to further reduce the vertical overall dimensions of the clamping device.

Preferably, the base 2 and the handle 4 are shaped so as to form, when coupled to one another, a box-shaped casing defining a volume for containing the pulley 3, the retaining means 5-6 and, at least partially, the control means 7. These latter are advantageously arranged so as to protrude from said casing, in lateral position.

Preferably, the base 2 is shaped so as to comprise a supporting portion 22, which can be fastened to the article on which the clamping device is to be mounted, and a second and third protective portion 23, 24, slidingly coupled with the handle 4.

The portion 22 of the base 2 is substantially flat and is shaped so as to form a seat for sliding coupling with the portion 31 of the pulley 3.

The portions 23, 24 of the base 2 emerge perpendicularly from the portion 22 and surround the pulley 3 at least partially, so as to protect it laterally.

The portion 24 of the base 2 is shaped in the form of a shell so as to protect the top of the retaining means 5-6 and the control means 7, to allow the retaining means 5-6 to interact with the toothed surface 331 and the control means 7 to protrude outward.

Preferably, the portion 24 of the base 2 is shaped so as to form anchor pins 241, 242, 243 for the retaining means 5-6, the control means 7 and the elastic means 8.

Preferably, the portions 22, 23 of the base 2 are produced in a one piece while the portion 24 is fastened to the portion 22 by means of screws (not shown) inserted in appropriate seats obtained in the anchor pins 241, 242, 243.

It has been seen how this allows simplification of assembly of the clamping device 1.

Preferably, the clamping device 1 comprises connection means 91, 910, 911 to operatively connect the base 2, pulley 3 and the handle 4 to one another.

Preferably, these connection means comprise a shaped pin 91 passing through an opening 21 of the base 2 and a through hole 35 of the pulley 3, along the rotation axis A.

The pin 91 comprises a shaped head 910, coupled with a corresponding shaped edge of the opening 21, and a threaded hole 911 arranged to house a screw (not shown) passing through an opening 41 of the handle 4, along the rotation axis A.

In this way, when the aforesaid screw and the pin 91 are mutually coupled, the pulley 3 is blocked between the base 2 and the handle 4 and it is free to rotate about the rotation axis A. The clamping device 1 thus has a substantially sandwich-shaped overall structure, in which the pulley 3 is positioned between the supporting base 2 and the handle 4 and in which the retaining means 5-6 and the control means are positioned between the portions 22 and 24 of the base 2, in lateral position with respect to the assembly formed by the pulley 3 and by the handle 4.

This makes it possible to obtain a considerable reduction of the overall dimensions, particularly in vertical direction (i.e. perpendicular with respect to the base 2).

Advantageously, the control means 7 comprise a control lever (preferably a single control lever), which can rotate at least partially with respect to the base 2 about a rotation axis (e.g. the rotation axis C in some embodiments of the invention) that is different from the rotation axis A and that is parallel to said rotation axis A.

According to the invention, the control means 7 are able to assume a retaining position R, a position of complete release P1 and a position of controlled release P2.

The retaining means 5-6 and control means 7 are arranged and operatively associated with one another so that:
  the first retaining means 5 prevent the pulley 3 from rotating according to the direction D2 when the control means 7 are in the retaining position R;
  the first and second retaining means 5-6 allow the pulley 3 to rotate freely according to the direction D2 when the control means 7 are actuated between the retaining position R and the position of complete release P1;

the first and second retaining means 5-6 allow the pulley 3 to rotate in a stepped manner according to the direction D2 when the control means are actuated between the retaining position R and the position of controlled release P2.

Preferably, the first retaining means 5 comprise a first ratchet, which can rotate at least partially with respect to the base 2 about a second rotation axis B parallel to the first rotation axis A.

The ratchet 5 is advantageously fixed to the base 2 at the anchor pin 241 arranged along the rotation axis B.

The ratchet 5 comprises a first tooth 51, which can engage with the toothed surface 331 of the pulley 3, and a third and fourth coupling portion 52-53 with the control means 7.

Preferably, the portions 52-53 of the ratchet 5 are located in opposite positions with respect to the rotation axis B.

The ratchet 5 is shaped and positioned so that the tooth 5 and the coupling portions 52-53 are arranged along different and superimposed reference planes, substantially parallel to the portion 22 of the base 2.

In particular, the portions 52-53 are arranged along a first reference plane, in proximal position with respect to the portion 22 of the base 2, while the tooth 51 is arranged along a second reference plane, in distal position with respect to the portion 22 of the base 2.

The ratchet 5 thus has a very compact structure, although having numerous coupling surfaces with the pulley 3 and the control means 7.

The second retaining means 6 comprise a second ratchet 6, which can rotate at least partially with respect to said supporting base about a third rotation axis C parallel to the rotation axis A.

The ratchet 6 is advantageously fixed to the base 2 at the anchor pin 243 arranged along the rotation axis C.

The ratchet 6 comprises a second tooth 61, which can engage with the toothed surface 331 of the pulley 3, and a fifth coupling portion 62 with the control means 7.

Preferably, the ratchet 6 is connected integrally with the control means 7 at the coupling portion 62.

In alternative embodiments of the present invention, the ratchet 6 could be separate with respect to the control means 7 and interact with these latter at the coupling portion 62.

Advantageously, the ratchet 6 is shaped and positioned so that the tooth 61 is arranged substantially along the same reference plane as the tooth 51 of the ratchet 5, so as to be able to interact with the toothed surface 331.

Moreover, the teeth 51 and 61 of the ratchets 5-6, are respectively positioned so as to engage alternately with the toothed surface 331 of the pulley 3, when the control means are actuated alternately between the retaining position R and the position of controlled release P2.

For this purpose, the teeth 51 and 61 are advantageously spaced by an arc of circumference (which circumscribes the toothed surface 331) having an approximate length $L=(N+\frac{1}{2}) \cdot P$, where P is the pitch of the teeth of the toothed surface 331 and N is a positive integer.

Preferably, the control lever 7 comprises a sixth and seventh coupling portion 71-72 with the first retaining means, in particular with the ratchet 5, and an eighth coupling portion 73 with the second retaining means, in particular with the ratchet 6.

Advantageously, the control lever 7 is shaped and positioned so that the coupling portions 71-72-73 are arranged along different and superimposed reference places, substantially parallel to the portion 22 of the base 2.

In particular, the coupling portions 71-72 are arranged substantially along the same reference plane as the coupling portions 52-53 of the ratchet 5, so as to be able to interact therewith.

The coupling portion 73 is instead arranged substantially along the same reference plane as the teeth 51, 61 of the ratchets 5-6.

Preferably, the control lever 7 and the ratchet 6 are connected integrally with one another (so as to form one piece) at the coupling portions 73 and 62, respectively.

Preferably, the control lever 7 can rotate with respect to the base 2 about the same rotation axis C as the ratchet 6 and is advantageously fixed at the same anchor pin 243.

In alternative embodiments of the present invention, the control lever 7 could form a separate body with respect to the ratchet 6.

In this case, the control lever 7 and the ratchet 6 are arranged so as to interact at the respective coupling portions 73 and 62 and the control lever 7 is arranged so as to rotate with respect to the base 2 at a rotation axis different from the rotation axis C and to be fixed to the base 2 at a fixing pin different from the anchor pin 243.

As indicated above, the control lever 7 is able to assume a retaining position R, a position of complete release P1 and a position of controlled release P2.

The control lever 7 can advantageously be manually actuated at a first and a second actuation surface 74-75.

By acting manually on the actuation surfaces 74-75, it is possible to move the control lever 7 to the position of complete release P1 and to the position of controlled release P2, respectively.

As mentioned above, the clamping device 1 preferably comprises elastic means 8 operatively associated with the ratchets 5-6 and with the control lever 7.

The elastic means 8 are arranged so as to oppose a disengaging movement of the first retaining means 5 from the toothed surface 311 and so as to oppose all movement of the control means 7 from the retaining position R.

The elastic means 8 preferably comprise a torsion spring fixed to the base 2 at the anchor pin 242.

A first end 81 of the spring 8 is operatively coupled to the tooth 51 of the ratchet 5 so as to oppose a disengaging movement thereof from the toothed surface 331 and, indirectly, oppose a movement of the control lever 7 from the retaining position R to the position of total release P1.

Figure 6:
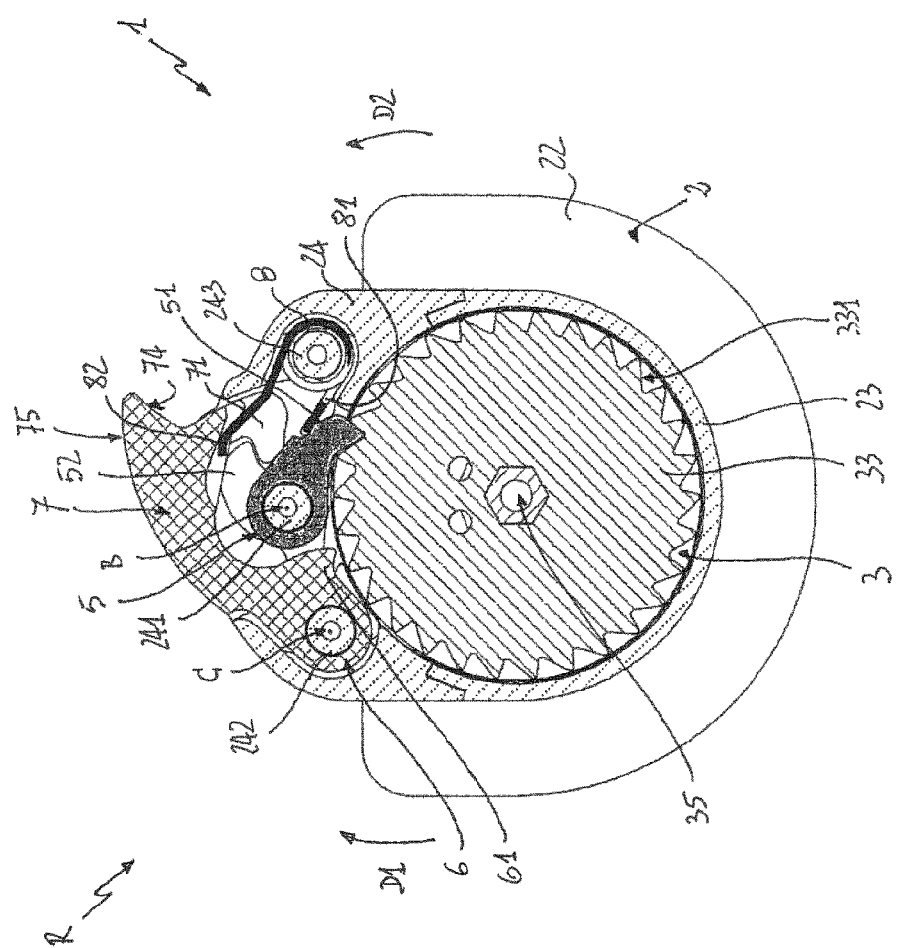
Figure 7:
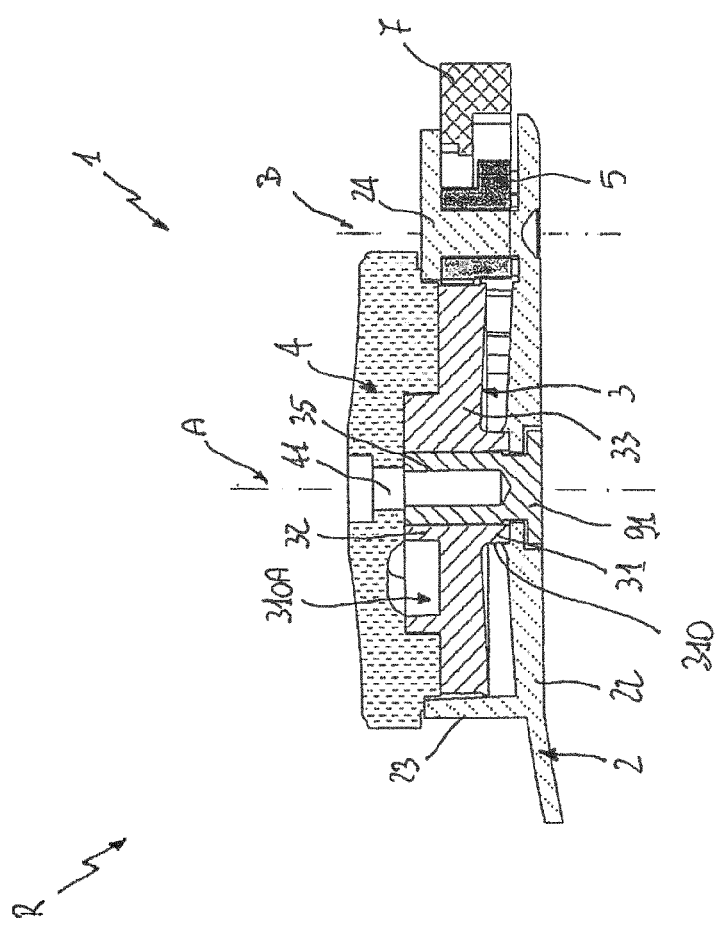
Figure 8:
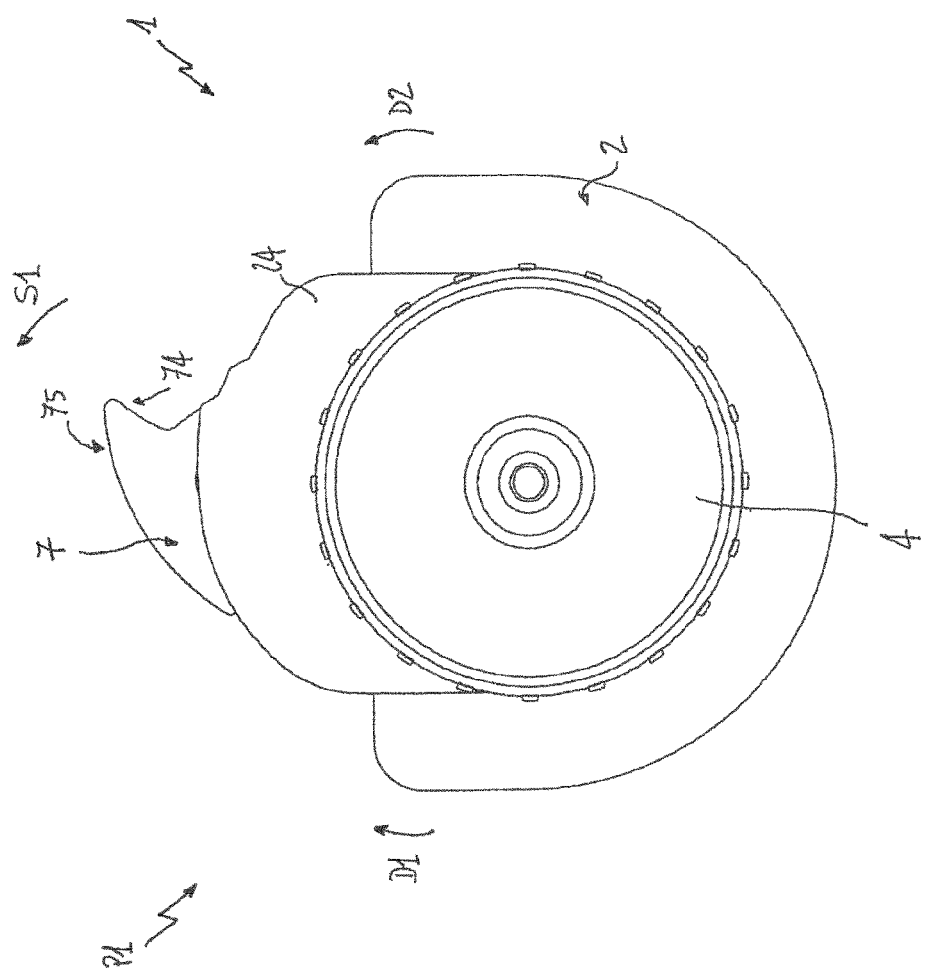
FIG. 8 is an elevational view of the clamping device shown in FIGS. 1-7 wherein the control lever is in the position of total release.
Figure 9:
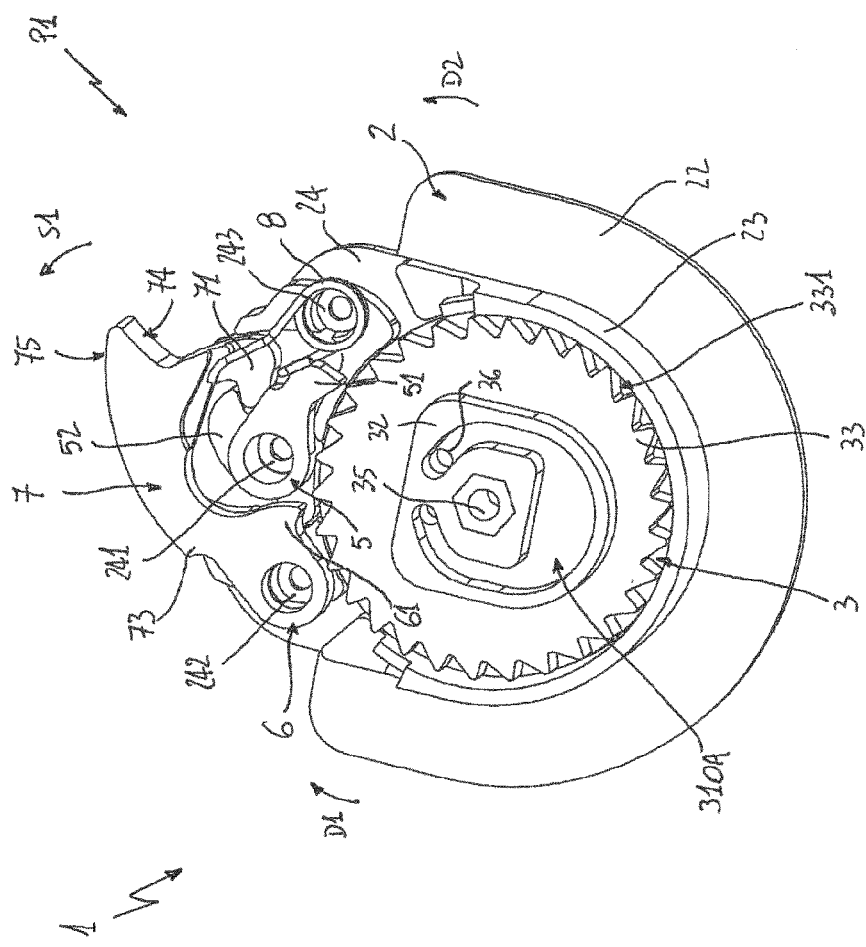
FIGS. 9-10 are perspective views of the clamping device shown in FIG. 8 wherein the control lever is in the position of total release.
Figure 10:
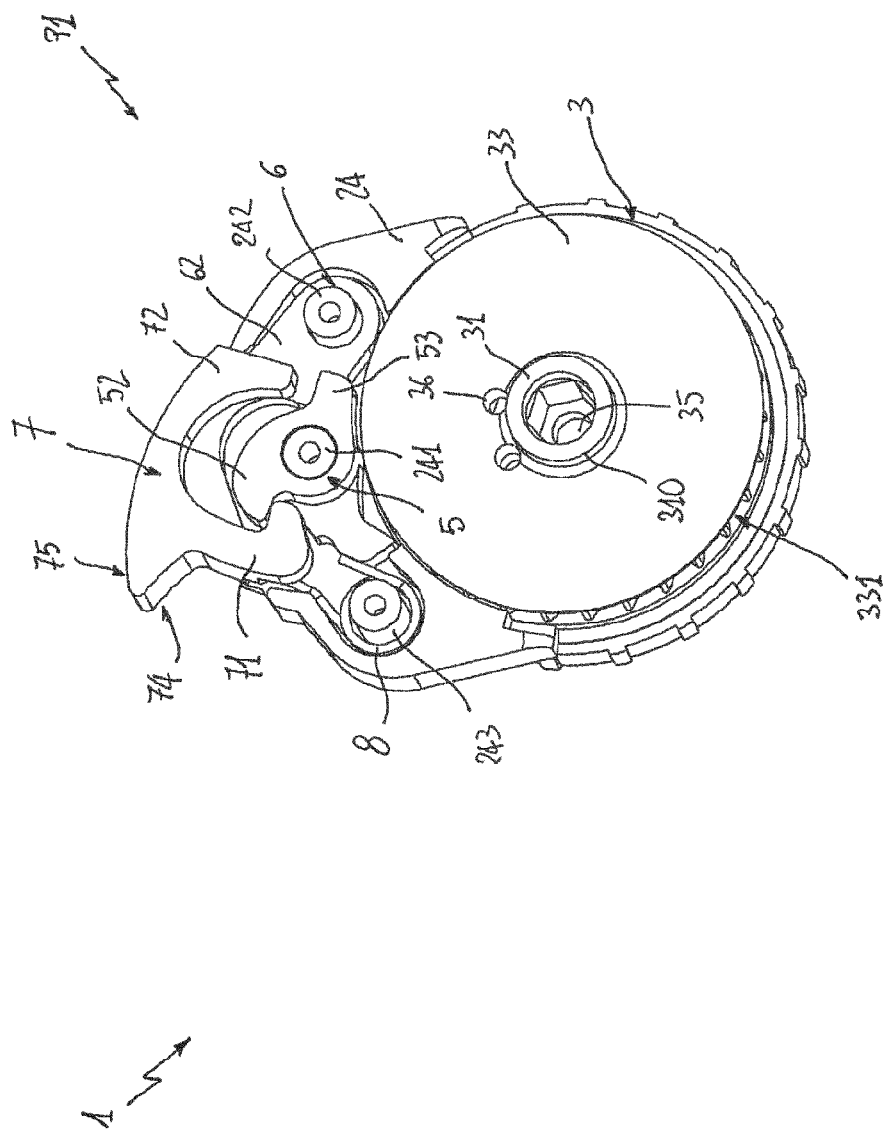
Figure 11:
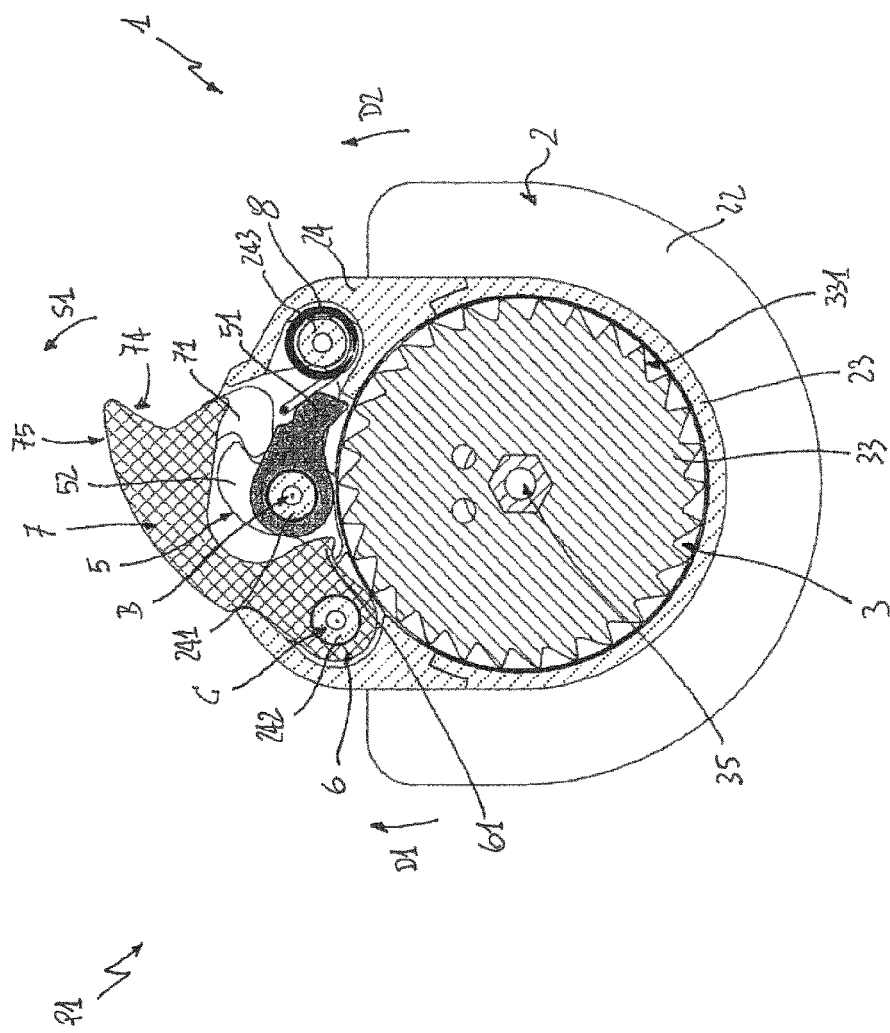
FIGS. 11-13 are sectional views of the clamping device shown in FIGS. 8-10 wherein the control lever is in the position of total release.
Figure 12:
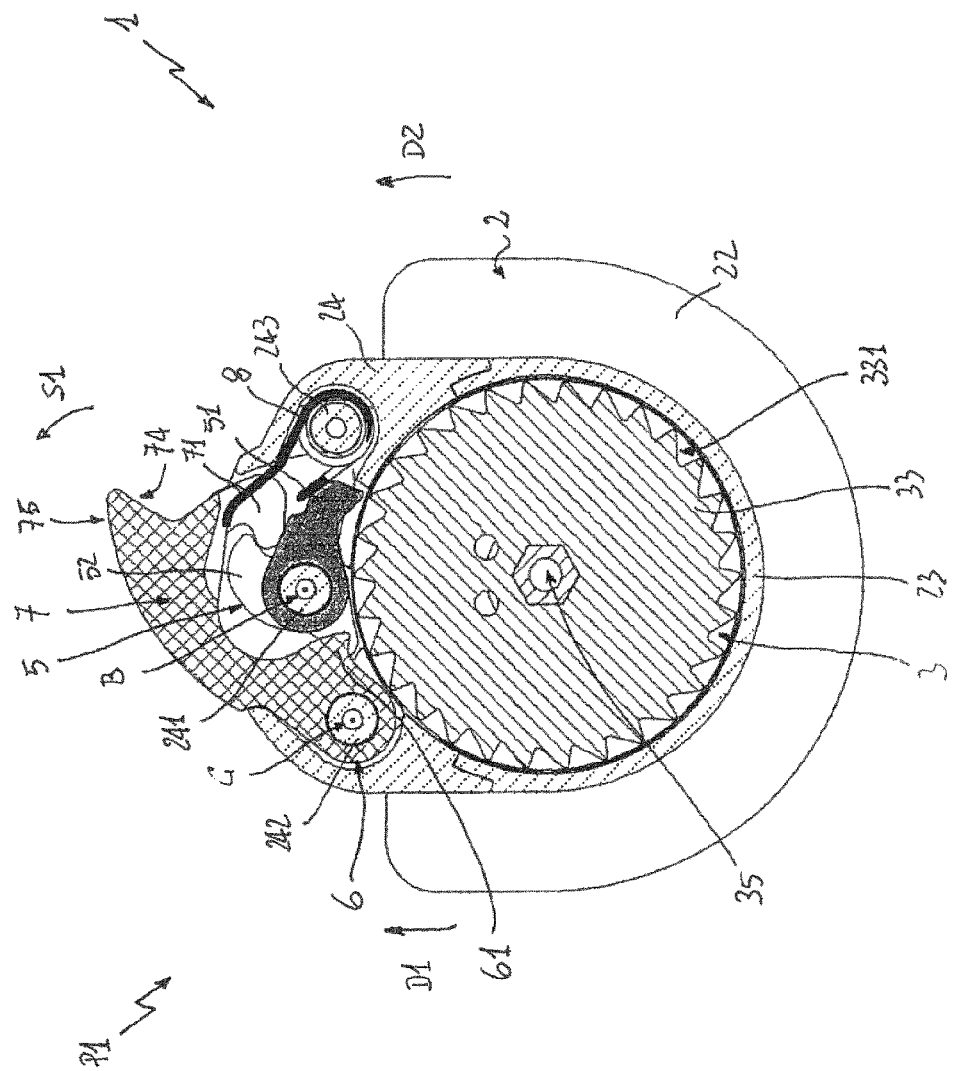
Figure 13:
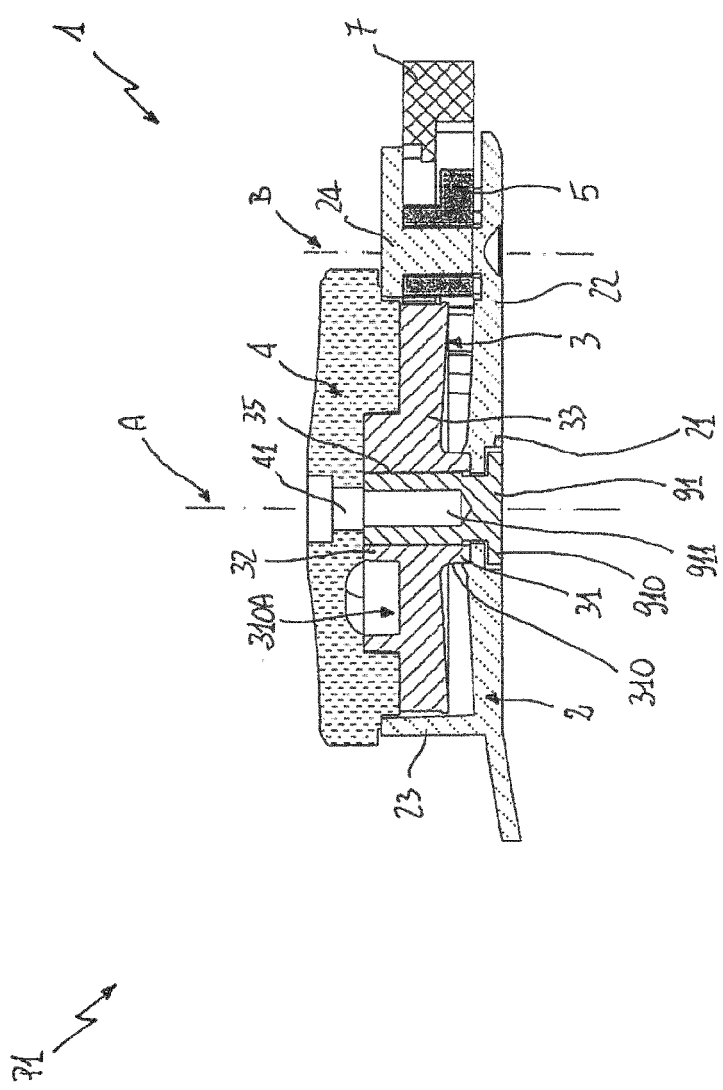
Figure 14:
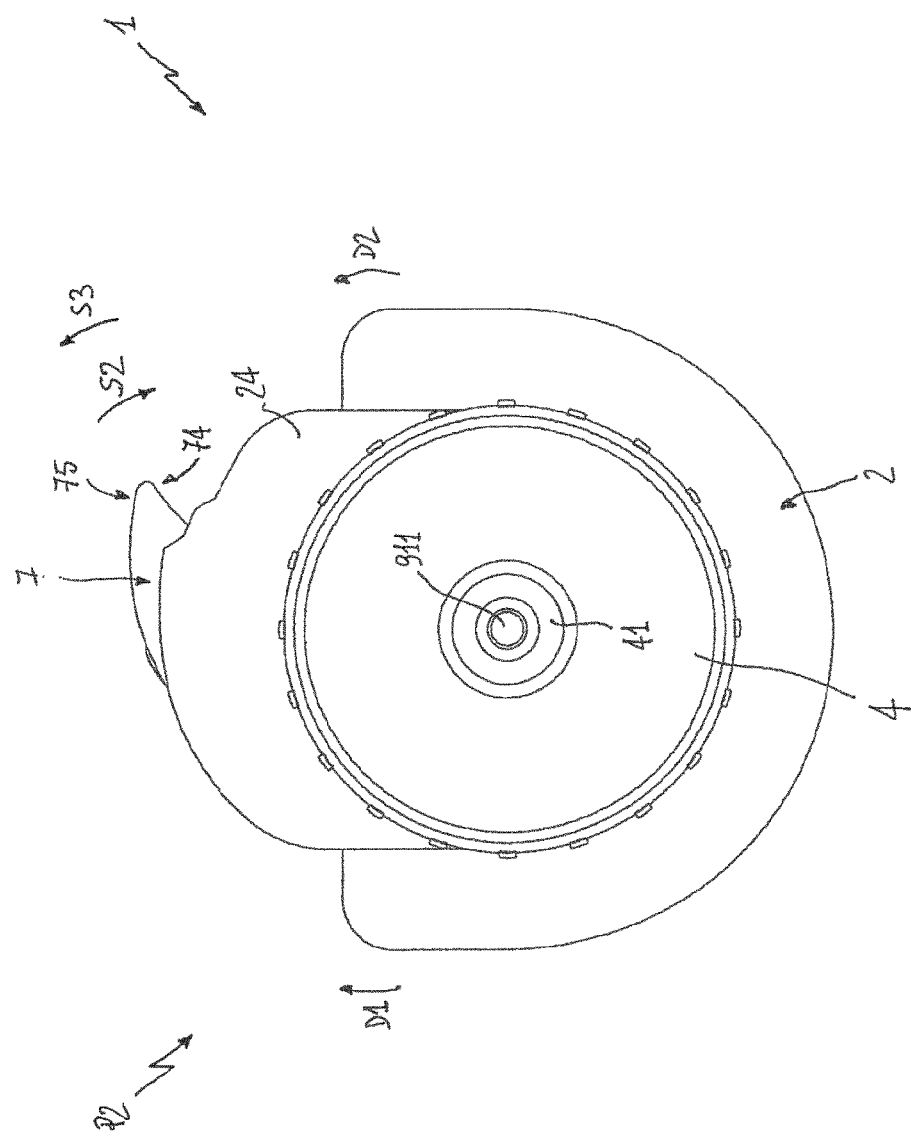
FIG. 14 is an elevational view of the clamping device shown in FIGS. 1-13 wherein the control lever is in the position of controlled release.
Figure 15:
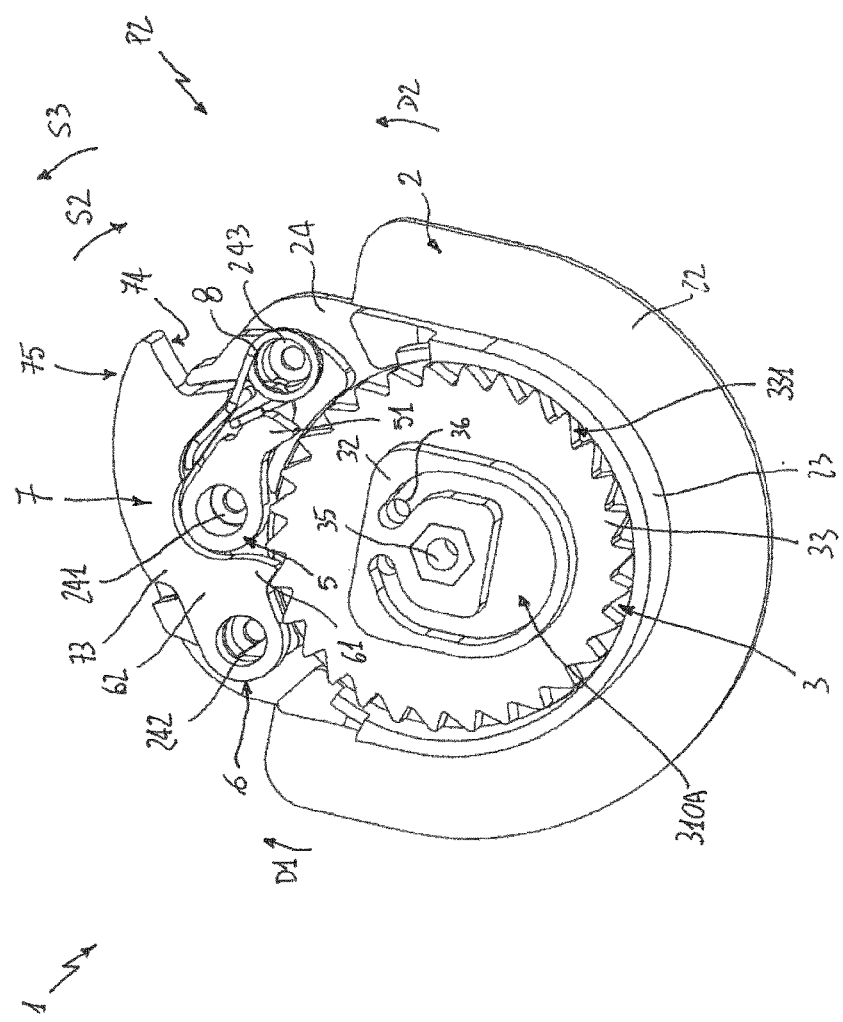
FIG. 15 is a perspective view of the clamping device shown in FIG. 14 wherein the control lever is in the position of controlled release.
Figure 16:
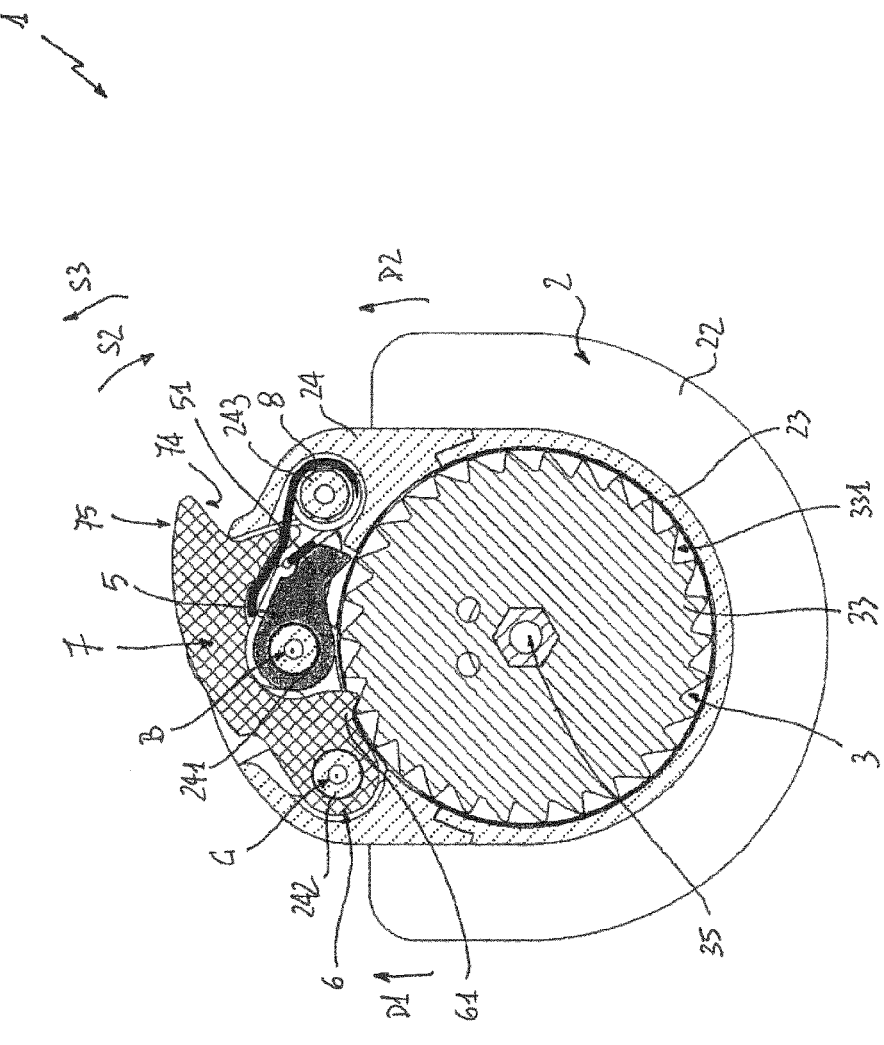
FIG. 16 is a sectional view of the clamping device shown in FIGS. 14-15 wherein the control lever is in the position of controlled release.
Figure 17:
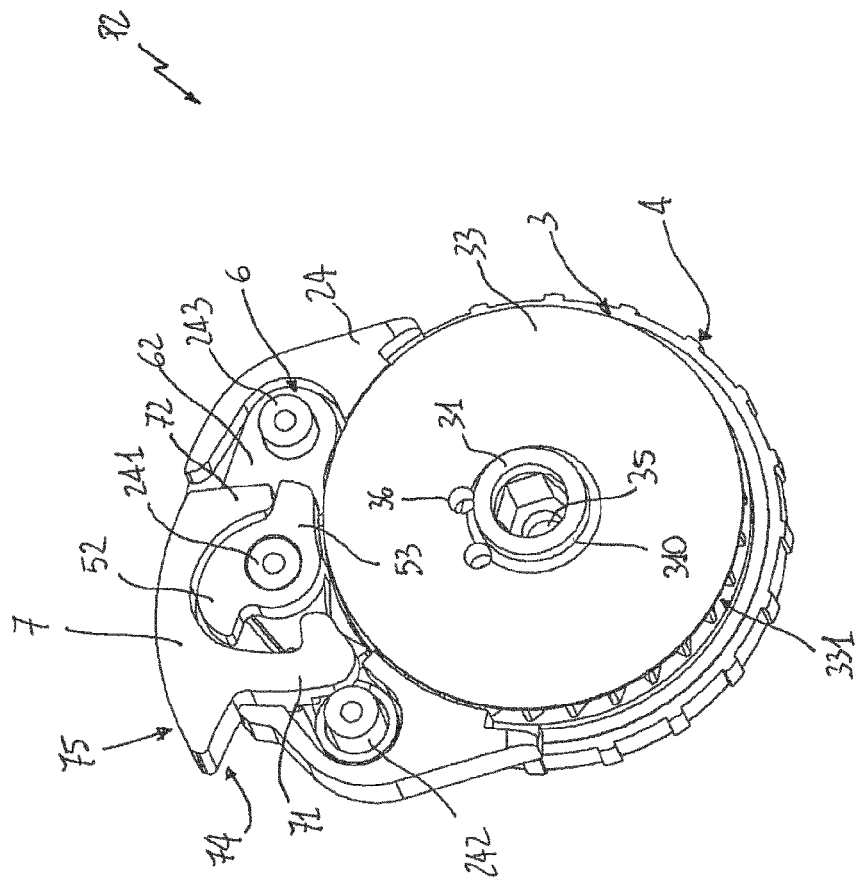
FIG. 17 is a perspective view of the clamping device shown in FIGS. 14-16 wherein the control lever is in the position of controlled release.
Figure 18:
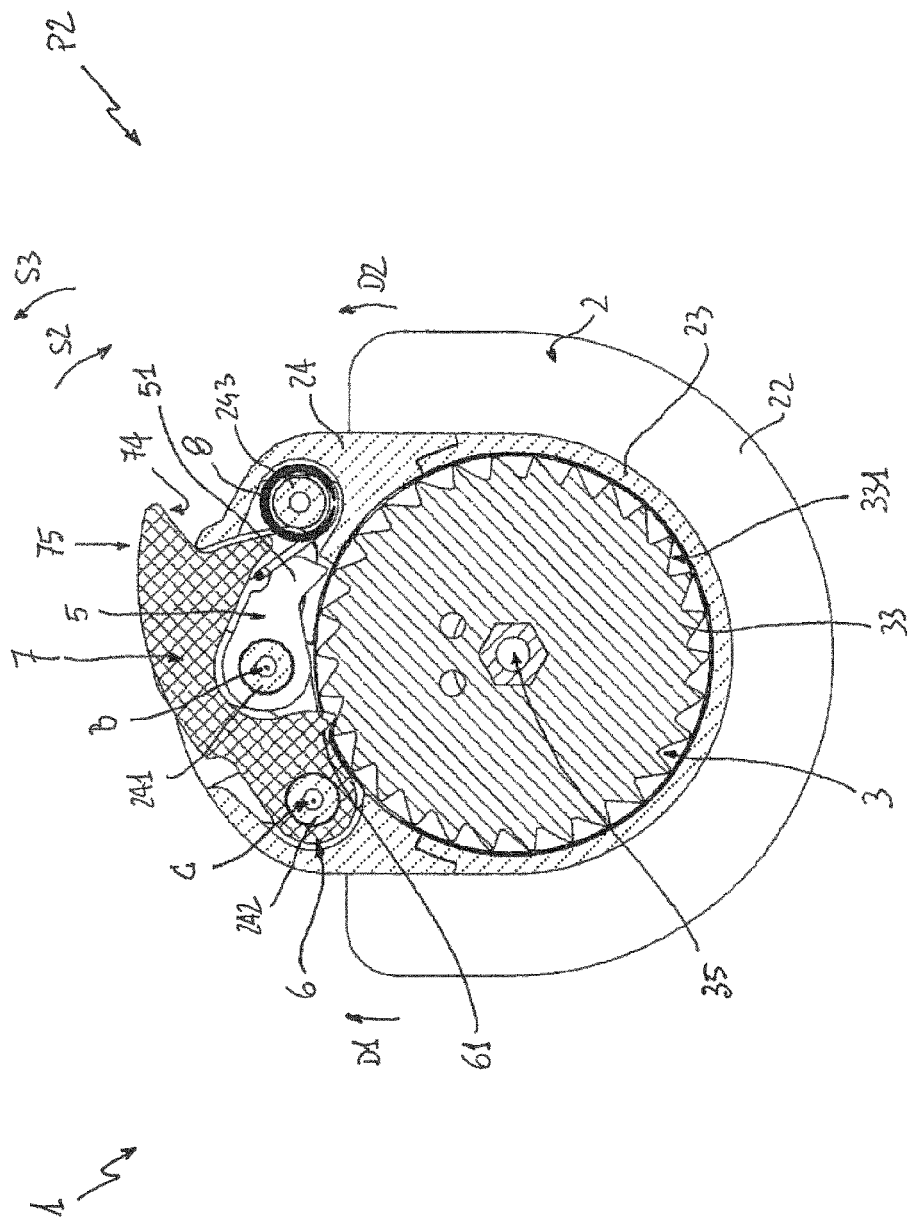
FIGS. 18-19 are sectional views of the clamping device shown in FIGS. 14-17 wherein the control lever is in the position of controlled release.
Figure 19:
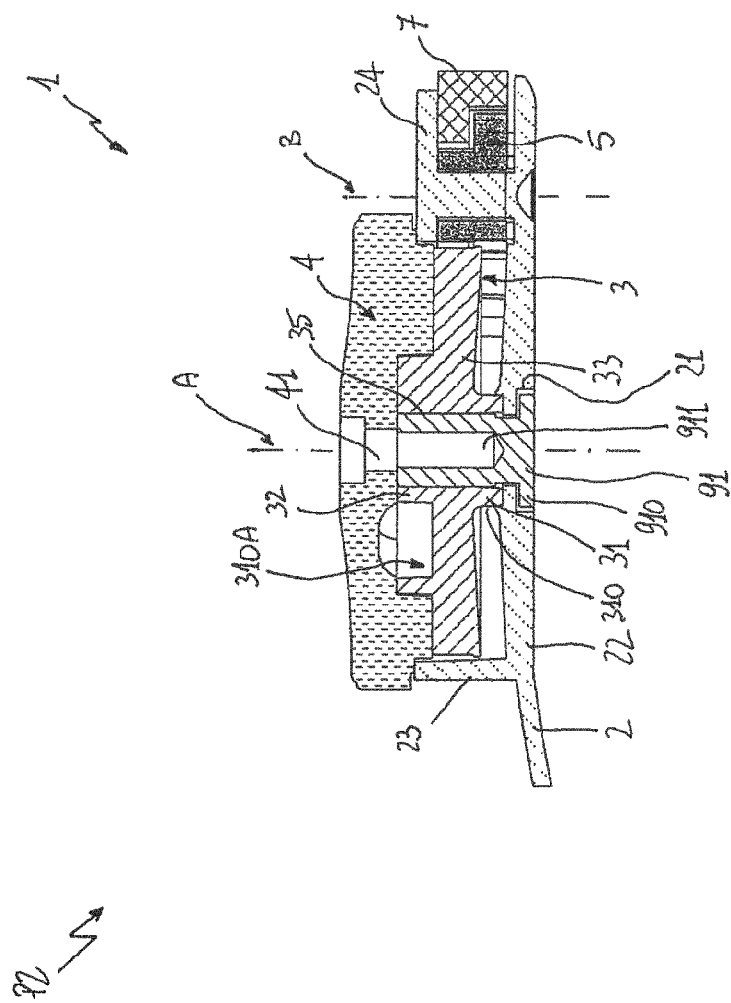

A second end 82 of the spring 8 is operatively coupled to the control lever 7 so as to oppose a movement thereof from the retaining position R to the position of controlled release P2 (FIG. 6).

Functioning of the clamping device 1 shall now be described in greater detail.

At rest, the control lever 7 is in the retaining position R (FIGS. 1-7), due to the action of the spring 8, which opposes any movement thereof from this position.

In this situation, the tooth 51 of the ratchet 5 is engaged with the toothed surface 331, while the tooth 61 of the ratchet 6 is not in contact with the toothed surface 331.

Therefore, the ratchet 5 prevents movement of the pulley 3 according to the unwinding direction D2 of the closure cable and maintains the pulley 3 in a locked position with respect to the direction of rotation D2.

It should be noted that neither the ratchet 5 nor the ratchet 6 are able to prevent the pulley 3 from moving according to the winding direction D1 of the closure cable, due to the orientation of the teeth of the ratchets 5-6 and of the toothed surface 131.

To increase the clamping tension of the closure cable, it is necessary to act on the handle 4, rotating it according to the direction D1.

The pulley 3 rotates, integrally with the handle 4, according to the direction D1.

The clamping device 1 thus exerts a tensile force on the closure cable, with consequent increase of the clamping tension.

During this activation phase of the clamping device 1, the control lever 7 remains in the retaining position R, as it is not operated.

Although the ratchet 5 does not prevent movement of the pulley 3 according to the direction D1, it remains in sliding contact with the toothed surface 131, due to the action of the spring 8 (end 81), which opposes the disengaging movement of the tooth 51 from the toothed surface 131.

After obtaining the desired clamping tension, the handle 4 is simply released.

Given that the control lever 7 is in the retaining position R, the ratchet 5 engages immediately with the toothed surface 131, maintaining the pulley 3 in a new locking position (with respect to a rotation according to the direction D2), corresponding to the position reached by the pulley during the rotation movement according to the direction D1.

This prevents any slackening of the clamping tension of the closure cable.

It is evident how fine adjustment of the clamping tension of the closure cable can also be performed by an inexperienced user.

Moreover, the clamping tension of the closure cable can be increased with a series of operations to activate the handle 4, according to the direction D1, until reaching the desired clamping tension.

To obtain complete release of the closure cable, the control lever 7 must be actuated, moving it (arrow S1) from the retaining position R to the position of total release P1 (FIGS. 8-13).

For this purpose, it is possible to act on the actuation surface 74, moving the control lever 7 away from the main body of the clamping device.

The control lever 7 performs a rotation movement S1 (in counter-clockwise direction in FIGS. 8-9, 11-12) about the rotation axis C until reaching the position P1, in which it comes into contact with a first stop surface of the portion 24 of the base 2.

During the rotation movement S1 of the control lever 7, the portion 71 of the control lever 7 exerts a force on the portion 52 of the ratchet 5 so as to determine a rotation movement of the ratchet 5, about the rotation axis B, with direction concordant with respect to the rotation movement S1 of the control lever 7.

The rotation movement of the ratchet 5 determines disengaging of the tooth 51 from the toothed surface 131.

The disengaging movement of the ratchet 5 is opposed by the action of the spring 8 (i.e. of the end 81 thereof—FIG. 6), which thus also indirectly opposes the movement of the control lever 7 toward the position P1 (the ratchet 5 and the control lever 7 are mechanically coupled to one another at the portions 51 and 71 respectively).

The rotation S1 of the control lever 7 toward the position P1 causes a concordant rotation movement of the ratchet 6, about the same rotation axis C, causing a further movement of the tooth 61 away from the toothed surface 131.

When the control lever 7 reaches the position of total release P1, neither the ratchet 5 nor the ratchet 6 are able to prevent the pulley 3 from moving according to the unwinding direction D2 of the closure cable.

The closure cable is subjected (due to the reaction force exerted by the parts clamped by the cable) to a tensile force that causes free rotation of the pulley 3 according to the direction D2, with consequent unwinding of the closure cable from the surface 310 of the pulley 3 and slackening of the clamping tension.

In this phase, it is possible (but not necessary) to accompany the rotation of the pulley 3, by rotating the handle 4 according to the direction D2.

After the clamping tension has been slackened (in a controlled manner), the control lever 7 can simply be released.

The action exerted by the spring 8 automatically returns the control lever 7 to the retaining position R.

The ratchet 5 engages once again with the toothed surface 131 and maintains the pulley 3 in a new locking position (with respect to a rotation according to the direction D2), corresponding to the position reached by the pulley during the rotation movement according to the direction D2, preventing any further slackening of the clamping tension.

To obtain controlled slackening of the clamping tension of the closure cable, one or more operations must be performed, each consisting of activating the control lever 7, moving it (arrow S2) from the retaining position R to the position of controlled release P2 (FIGS. 14-19) and subsequently of releasing of the control lever 7, so that it automatically returns (arrow S3) to the retaining position R.

Functioning of the clamping device 1 during one of these operations to activate/release the control lever 7 shall now be described in greater detail.

It should be noted how, during this operation, the closure cable is constantly subjected to a tensile force that tends to cause the pulley 3 to rotate according to the direction D2, due to the reaction force exerted by the parts clamped by the cable.

To take the control lever to the position P2, it is possible to act on the actuation surface 75, pressing the control lever 7 toward the main body of the clamping device.

The control lever 7 performs a rotation movement S2 (clockwise in FIGS. 14-16, 18), about the rotation axis C, until reaching the position P2, in which it comes into contact with a second stop surface of the portion 24 of the base 2.

The movement of the control lever 7 toward the position P2 is opposed by the action of the spring 8 (end 82).

During the rotation S2 of the control lever 7, the portion 71 of the control lever 7 moves away from the portion 52 of the ratchet 5, not interacting therewith.

The portion 72 of the control lever 7 exerts a force on the portion 53 of the ratchet 5 determining a rotation movement of the ratchet 5, about the rotation axis B in the opposite direction with respect to the rotation movement S2 of the control lever 7.

The rotation movement of the ratchet 5 determines disengaging of the tooth 51 from the toothed surface 131.

The disengaging movement of the ratchet 5 is opposed by the action of the spring 8 (end 81), which thus further opposes (in an indirect manner) the movement of the control lever 7 toward the position P2.

The rotation S2 of the control lever 7 toward the position P2 determines a concordant rotation movement of the ratchet 6 about the rotation axis C. The tooth 61 of the ratchet 6 thus engages with the toothed surface 131.

By virtue of the mutual positioning between the teeth 51, 61 of the ratchets 5-6, during the movement S2 of the control lever 7, the pulley 3 performs a small rotation according to the direction D2, during which each tooth of the toothed surface 131 travels a distance approximately equal to P/2, where P is the pitch of the toothed surface 131.

In other words, during the movement S2 of the control lever 7, the pulley 3 rotates by ½ tooth according to the direction D2, thus determining a corresponding slackening of the clamping tension of the closure cable.

When the control lever 7 reaches the position P2, the ratchet 6 engages definitively with the toothed surface 131 and maintains the pulley 3 in a new locking position (with respect to a rotation according to the direction D2), corresponding to the position reached by the pulley during the rotation movement by ½ tooth according to the direction D2.

When the control lever 7 is released, it automatically returns (arrow S3) to the retaining position R.

The rotation S3 of the control lever 7 toward the retaining position R determines a concordant rotation movement of the ratchet 6 about the rotation axis C. The tooth 61 of the ratchet 6 thus disengages from the toothed surface 131.

The portion 73 of the control lever 7 exerts forces on the portion 53 of the ratchet 5. The action of the spring 8 (end 81) thus determines a rotation movement of the ratchet 5 about the rotation axis B, in the opposite direction with respect to the rotation movement S3 of the control lever 7.

The rotation movement of the ratchet 5 thus determines, once more, engaging of the tooth 51 with the toothed surface 131, which is completed when the control lever 7 reaches the retaining position R.

By virtue of the mutual positioning of the teeth 51, 61, during the movement S3 of the control lever 7 the pulley 3 performs a further small rotation according to the direction D2, during which each tooth of the toothed surface 131 travels a further distance approximately equal to P/2, where P is the pitch of the toothed surface 131.

In other words, during the movement S3 of the control lever 7, the pulley 3 rotates once again by ½ tooth according to the direction D2, thus determining a further corresponding slackening of the clamping tension of the closure cable.

When the control lever 7 reaches the retaining position R, the ratchet 5 engages definitively with the toothed surface 131 and maintains the pulley 3 in a new locking position (with respect to a rotation according to the direction D2), corresponding to the position reached by the pulley during the further rotation movement by ½ tooth according to the direction D2.

From the above it is evident that with each operation to activate/release the control lever 7, the pulley 3 rotates by a single tooth according to the direction D2.

It is thus possible to obtain a progressive and controlled slackening of the clamping tension of the closure cable by repeatedly performing the activation/release operation of the control lever 7 described above, i.e. by activating the control lever 7 alternately between the retaining position 7 and the position of controlled release P2.

Functioning of the clamping device 1 has been described with specific reference to the embodiments shown in FIGS. 1-19.

Naturally, variants of embodiment are also possible.

For example, the clamping device 3 could be operatively associated with a plurality of closure cables.

In this case, each of the closure cables can advantageously be operatively connected with the pulley 3 at the winding surface 310.

The directions of rotation of the pulley 3 and of the control lever 7 could be reversed, by appropriately modifying the connection of the closure cable, the orientation of the toothed surface 131 and of the teeth 51, 61 and the operating arrangement of the parts.

The ratchet 5 could be shaped and positioned so that the tooth 5 and the coupling portions 52-53 are arranged along a same reference plane, substantially parallel to the portion 22 of the base 2.

The control lever 7 could be shaped and positioned so that the coupling portions 71-72-73 are arranged along a same reference plane, substantially parallel to the portion 22 of the base 2. The elastic means 8 could comprise a plurality of torsion springs fixed to the anchor pin 243 and operatively associated with the ratchet 5 and with control lever 7.

For example, a first spring could be operatively coupled to the tooth 51 of the ratchet 5 so as to oppose the disengaging movement thereof from the toothed surface 331 and, indirectly, oppose a movement of the control lever 7 from the retaining position R to the position of total release P1.

A second spring could be operatively coupled to the control lever 7 so as to oppose a movement thereof from the retaining position R to the position of controlled release P2.

It has been found in practice that the clamping device according to the invention achieves the intended aims and objects.

The clamping device according to the invention allows the parts of the article operatively associated with the closure cable to be clamped (also incrementally) with simple manual operations.

Moreover, the clamping device according to the invention allows the closure cable to be rapidly released or the clamping tension to be slackened by acting on a single control lever. It is evident how the functionalities described above enable an excellent level of clamping tension to be obtained between the parts, easily adjustable with continuity and selectivity.

The clamping device, according to the invention, is easy to use in a very intuitive way. It can be easily activated even in adverse environmental conditions, for example wearing gloves or in ice and snow.

The clamping device according to the invention has a high level of structural integration between the parts. This makes it possible to obtain a relatively simple, compact (above all in vertical direction, i.e. perpendicular to the base 2) and sturdy overall structure.

This structure, particularly compact, is easy to produce on an industrial scale, at competitive costs with respect to the products currently available on the market.

The invention claimed is:
1. A clamping device comprising:
a supporting base;
a pulley, operatively associable with a closure cable and comprising a winding surface for said closure cable, said pulley configured to rotate with respect to said supporting base about a first rotation axis, substantially perpendicular to said supporting base, according to a first winding direction or a second unwinding direction of said closure cable;
a handle coupled to said pulley and configured to be manually actuated to rotate said pulley;
first and second retainers, operatively engageable with a toothed surface of said pulley;
a control body, separate from said handle and operatively associated with said retainers, said control body comprising a control lever, which can rotate at least partially with respect to said supporting base about a rotation axis different from said first rotation axis and parallel to said first rotation axis;

said first retainer preventing said pulley from rotating according to said second direction when said control body is in a retaining position, said first and second retainers allowing said pulley to rotate freely according to said second direction, when said control body is actuated between said retaining position and a position of complete release, said first and second retainers allowing said pulley to rotate in a stepped manner according to said second direction, when said control body is actuated between said retaining position and a position of controlled release.

2. The clamping device according to claim 1, wherein said first retainer comprises a first ratchet, which can rotate at least partially with respect to said supporting base about a second rotation axis parallel to said first rotation axis, said first ratchet comprising a first tooth engageable with the toothed surface of said pulley and a third and fourth coupling portion with said control body.

3. The clamping device according to claim 2, wherein:

said first retainer comprises a first ratchet, which can rotate at least partially with respect to said supporting base about a second rotation axis parallel to said first rotation axis, said first ratchet comprising a first tooth engageable with the toothed surface of said pulley and a third and fourth coupling portion with said control body;

said second retainer comprises a second ratchet, which can rotate at least partially with respect to said supporting base, about a third rotation axis parallel to said first rotation axis, said second ratchet comprising a second tooth engageable with the toothed surface of said pulley and a fifth coupling portion with said control body; and the first and second tooth of said first and second ratchet are positioned with respect to one another so as to engage alternately with the toothed surface of said pulley, when said control body is actuated alternately between said retaining position and said position of controlled release.

4. The clamping device according to claim 2, wherein said second retainer comprises a second ratchet, which can rotate at least partially with respect to said supporting base, about a third rotation axis parallel to said first rotation axis, said second ratchet comprising a second tooth engageable with the toothed surface of said pulley and a fifth coupling portion with said control body.

5. The clamping device according to claim 2, wherein said control lever comprises a sixth and seventh coupling portion with said first retainer and an eighth coupling portion with said second retainer.

6. The clamping device according to claim 2, further comprising an elastic member fixed to said supporting base and arranged so as to oppose a disengaging movement of said first retainer from the toothed surface of said pulley and to oppose a movement of said control body from said retaining position.

7. The clamping device according to claim 2 in combination with a cable closure system.

8. The clamping device according to claim 1, wherein said second retainer comprises means comprise a second ratchet, which can rotate at least partially with respect to said supporting base, about a third rotation axis parallel to said first rotation axis, said second ratchet comprising a second tooth engageable with the toothed surface of said pulley and a fifth coupling portion with said control body.

9. The clamping device according to claim 8, wherein said control lever and said second ratchet are connected integrally to one another to form one piece.

10. The clamping device according to claim 8, wherein:

said first retainer comprises a first ratchet, which can rotate at least partially with respect to said supporting base about a second rotation axis parallel to said first rotation axis, said first ratchet comprising a first tooth engageable with the toothed surface of said pulley and a third and fourth coupling portion with said control body;

said second retainer comprises a second ratchet, which can rotate at least partially with respect to said supporting base, about a third rotation axis parallel to said first rotation axis, said second ratchet comprising a second tooth engageable with the toothed surface of said pulley and a fifth coupling portion with said control body; and the first and second tooth of said first and second ratchet are positioned with respect to one another so as to engage alternately with the toothed surface of said pulley, when said control body is actuated alternately between said retaining position and said position of controlled release.

11. The clamping device according to claim 8, wherein said control lever comprises a sixth and seventh coupling portion with said first retainer and an eighth coupling portion with said second retainer.

12. The clamping device according to claim 8, further comprising an elastic member fixed to said supporting base and arranged so as to oppose a disengaging movement of said first retainer from the toothed surface of said pulley and to oppose a movement of said control body from said retaining position.

13. The clamping device according to claim 8 in combination with a cable closure system.

14. The clamping device according to claim 1, wherein said control lever comprises a sixth and seventh coupling portion with said first retainer and an eighth coupling portion with said second retainer.

15. The clamping device according to claim 14, wherein said control lever and said second ratchet are connected integrally to one another to form one piece.

16. The clamping device according to claim 14, further comprising an elastic member fixed to said supporting base and arranged so as to oppose a disengaging movement of said first retainer from the toothed surface of said pulley and to oppose a movement of said control body from said retaining position.

17. The clamping device according to claim 1, further comprising an elastic member fixed to said supporting base and arranged so as to oppose a disengaging movement of said first retainer from the toothed surface of said pulley and to oppose a movement of said control body from said retaining position.

18. The clamping device according to claim 1 in combination with a cable closure system.

19. The clamping device according to claim 1 in combination with a device that includes a closure system.

20. The clamping device according to claim 19, wherein the device that includes a closure system is a garment, footwear, sporting equipment or an orthopedic medical device.

* * * * *